(12) United States Patent
Shmulevich et al.

(10) Patent No.: US 10,915,804 B1
(45) Date of Patent: Feb. 9, 2021

(54) PACKAGE IDENTIFICATION USING GRAPHICS ON SHIPPING LABELS

(71) Applicant: Amazon Technologies, Inc., Seattle, WA (US)

(72) Inventors: Roman Shmulevich, Woodbridge (CA); Keith Deacon, Monroe, WA (US); Vikram Raghavan, Seattle, WA (US); Alton Paul Werronen, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/278,662

(22) Filed: Feb. 18, 2019

(51) Int. Cl.
*G06K 19/06* (2006.01)
*G06K 7/14* (2006.01)

(52) U.S. Cl.
CPC ....... *G06K 19/06093* (2013.01); *G06K 7/143* (2013.01); *G06K 7/1443* (2013.01); *G06K 7/1456* (2013.01); *G06K 19/06028* (2013.01)

(58) Field of Classification Search
CPC .......... G06K 19/06093; G06K 7/1456; G06K 7/1443; G06K 19/06028; G06K 7/143
See application file for complete search history.

(56) References Cited

U.S. PATENT DOCUMENTS

| 7,375,841 | B1 * | 5/2008 | Polis | B29B 17/0036 |
| | | | | 358/1.15 |
| 9,082,207 | B2 * | 7/2015 | Walker | G06T 11/00 |
| 2004/0153424 | A1 * | 8/2004 | Lussow | G06Q 30/0283 |
| | | | | 705/400 |
| 2005/0119786 | A1 * | 6/2005 | Kadaba | G07B 17/00467 |
| | | | | 700/224 |

* cited by examiner

*Primary Examiner* — Seung H Lee
(74) *Attorney, Agent, or Firm* — Patterson + Sheridan, LLP

(57) ABSTRACT

Embodiments herein describe design techniques for generating a fingerprint for a shipping label using symbols or bit segments. These symbols or bit segments can be read using lower resolution cameras at greater distances than 1D or 2D barcodes in the shipping labels. In one embodiment, a label designer identifies blank zones in the design of a shipping label and selects symbols to place in those zones. The label designer can select random types of symbols and random sizes for those symbols. When reading the shipping label, a CV system can identify the symbols and their sizes and generate the fingerprint. In another embodiment, the label designer places bit segments in the identified blank zones. The CV system can then read the blank zones in a predefined order and merge the bits segments to form a digital fingerprint for the shipping label.

20 Claims, 11 Drawing Sheets

PACKAGE IDENTIFICATION USING GRAPHICS ON SHIPPING LABELS

BACKGROUND

The present invention relates to generating a fingerprint for a shipping label using symbols or bit segments.

Currently, shipping labels include one or more barcodes which are used to track the package through a shipping facility or when being delivered. These barcodes can be 1D or 2D barcodes (e.g., matrix barcodes). While a delivery person can use a handheld barcode reader to read these barcodes, often these barcodes are read using a captured image of the shipping label. That is, a conveyor may move the package underneath a camera which captures an image of the shipping label. A computer vision (CV) system uses the digital image to identify the barcodes in the shipping label which are then decoded by a barcode reader application. Thus, the ability to read (or decode) these barcodes depends directly on the quality of the image captured by the camera. The farther away the camera is from the shipping label, the less likely the barcode reader will be able to correctly decode the barcodes in the digital image. To counteract this degradation in the digital image, a higher resolution (and often more expensive) camera can be used, but this increases cost and also can slow down the reading process since higher resolution cameras generate images with significantly more data that must be processed by the CV system.

DETAILED DESCRIPTION

Embodiments herein describe design techniques for generating a fingerprint for a shipping label using symbols or bit segments (generally referred to as graphics). These graphics can be read using lower resolution cameras at greater distances than 1D or 2D barcodes in the shipping labels. Thus, the package can be identified using the fingerprint generated from the graphics even when the barcodes in the shipping label are unreadable.

In one embodiment, a label designer identifies blank zones in the design of a shipping label and selects symbols to place in those zones. The label designer can select random types of symbols and random sizes for those symbols. After the shipping label is placed on a package, a CV system can identify the symbols and their sizes and generate the fingerprint. An inventory tracking system can use the fingerprint to track the package through the shipping facility.

In another embodiment, rather than placing symbols in the blank zones, the label designer places bit segments in the blank zones. For example, bits [0-5] of the fingerprint may be placed in a first blank zone, bits [6-15] are placed in a second blank zone, and bits [16-32] are placed in a third blank zone. The number of bits placed in each blank zone can depend on the dimensions of the blank zones in the shipping label. The CV system can then read the blank zones in a predefined order (e.g., starting from the upper-left corner of the shipping label) and merge the bits segments to form a digital fingerprint (e.g., a 32-bit fingerprint) for the shipping label which can again be used to track the package.

Figure 1:
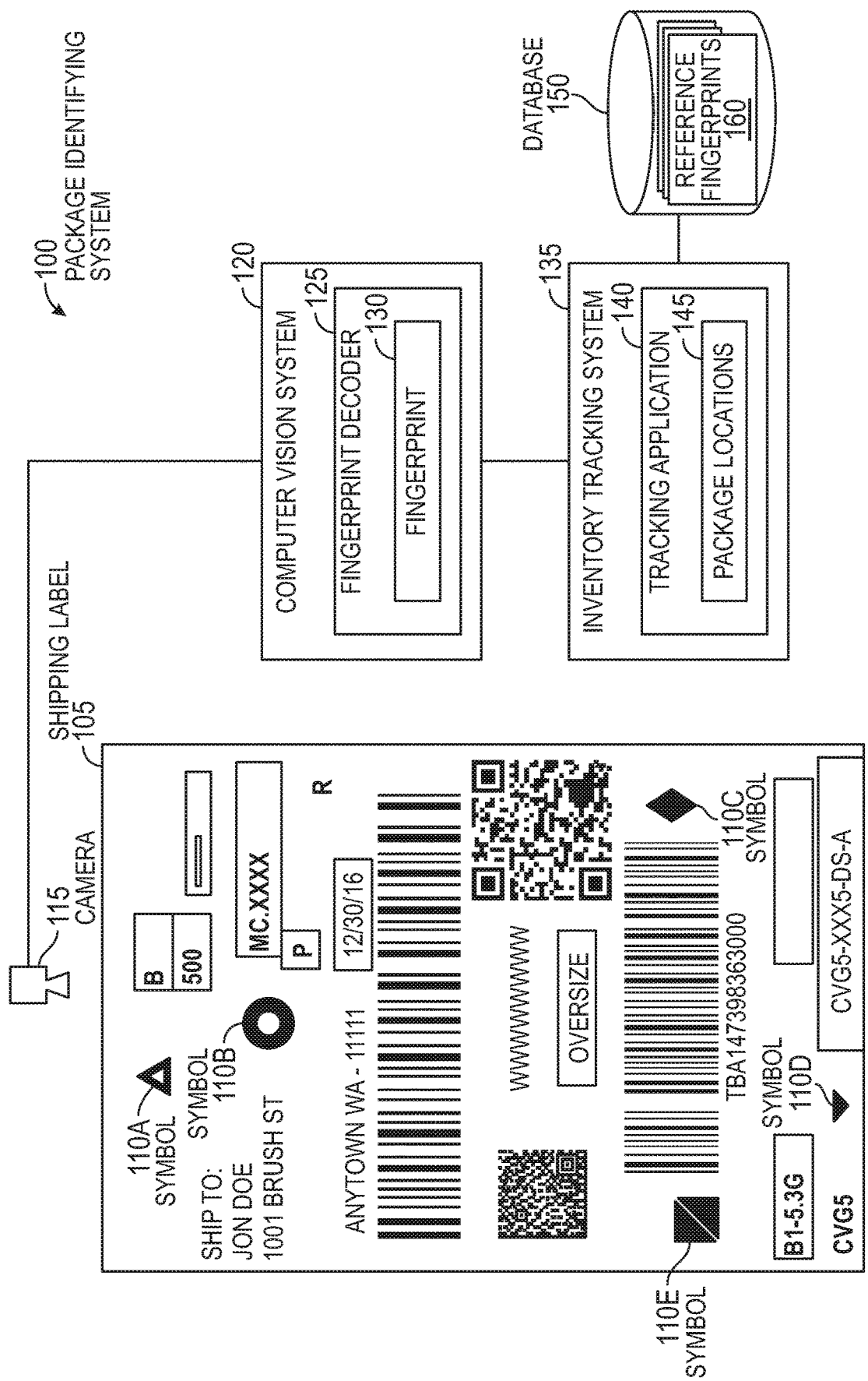
FIG. 1 illustrates using symbols in a shipping label to generate a fingerprint for tracking a package, according to various embodiments.

FIG. 1 illustrates using symbols 110 in a shipping label 105 to read (or decode) a fingerprint 130 for tracking a package, according to various embodiments. FIG. 1 illustrates a package identifying system 100 that includes a camera 115 that captures an image of the shipping label 105. The camera 115 may be mounted several feet above the shipping label 105 which may prevent the camera 115 from capturing a digital image with sufficient resolution for a CV system 120 to decode the 1D and 2D barcodes on the label 105. Rather than using a more expensive higher resolution camera (or lowering the camera 115), the CV system 120 instead identifies the fingerprint 130 using the symbols 110A-E in the label 105.

The CV system 120 includes a fingerprint decoder 125 which is a software application that receives a digital image of the shipping label 105 from the camera 115. Using this image, the fingerprint decoder 125 identifies the types of the symbols 110 as well as their sizes, which, in one example, is a measure of the largest dimension of each of the symbols 110. Using the type and sizes of the symbols 130, the fingerprint decoder 125 produces a fingerprint 130 for the shipping label 105 and the corresponding package on which the label 105 is affixed. In one embodiment, the fingerprint 130 for each shipping label 105 may be unique for a certain time period. For example, when designing the shipping label 105, a label designer (which is discussed in later figures) may select a different combination of types and sizes of the symbols 110 than assigned to any previous shipping label in the last one or two days. After that time period is expired, the same combination of types and sizes of symbols shown in FIG. 1 may be assigned to a different shipping label since it is assumed the previous shipping label has transited outside the shipping facility (where the symbols 110 are no longer used to generate a fingerprint 130 for tracking the package).

Once the fingerprint decoder 125 has identified the fingerprint 130 for the package, the CV system 120 transmits the fingerprint 130 to an inventory tracking system 135 which includes a tracking application 140 (e.g., a software application) that stores locations 145 for the packages in the shipping facility. In one embodiment, the tracking application 140 compares the fingerprint 130 to reference fingerprints 160 stored in a database 150. These reference fingerprints 160 may have been generated when the shipping labels 105 were first designed or printed. Put differently, each time a shipping label is designed or printed, the label designer or a CV system 120 generates a reference fingerprint 160 for that label, which is then stored in the database 150. Thus, as the package traverses through the shipping facility and is read by the camera 115, the resulting fingerprint 130 can be compared to the reference fingerprints 160 to identify a match. When there is a match, the tracking application 140 updates the location 145 of the corresponding package to the location of the camera 115. In this manner, as the package traverses through different stages that have respective cameras 115, the tracking application 140 can update the package location 145 by comparing the fingerprint 130 to the reference fingerprints 160 in the database 150.

Figure 2:
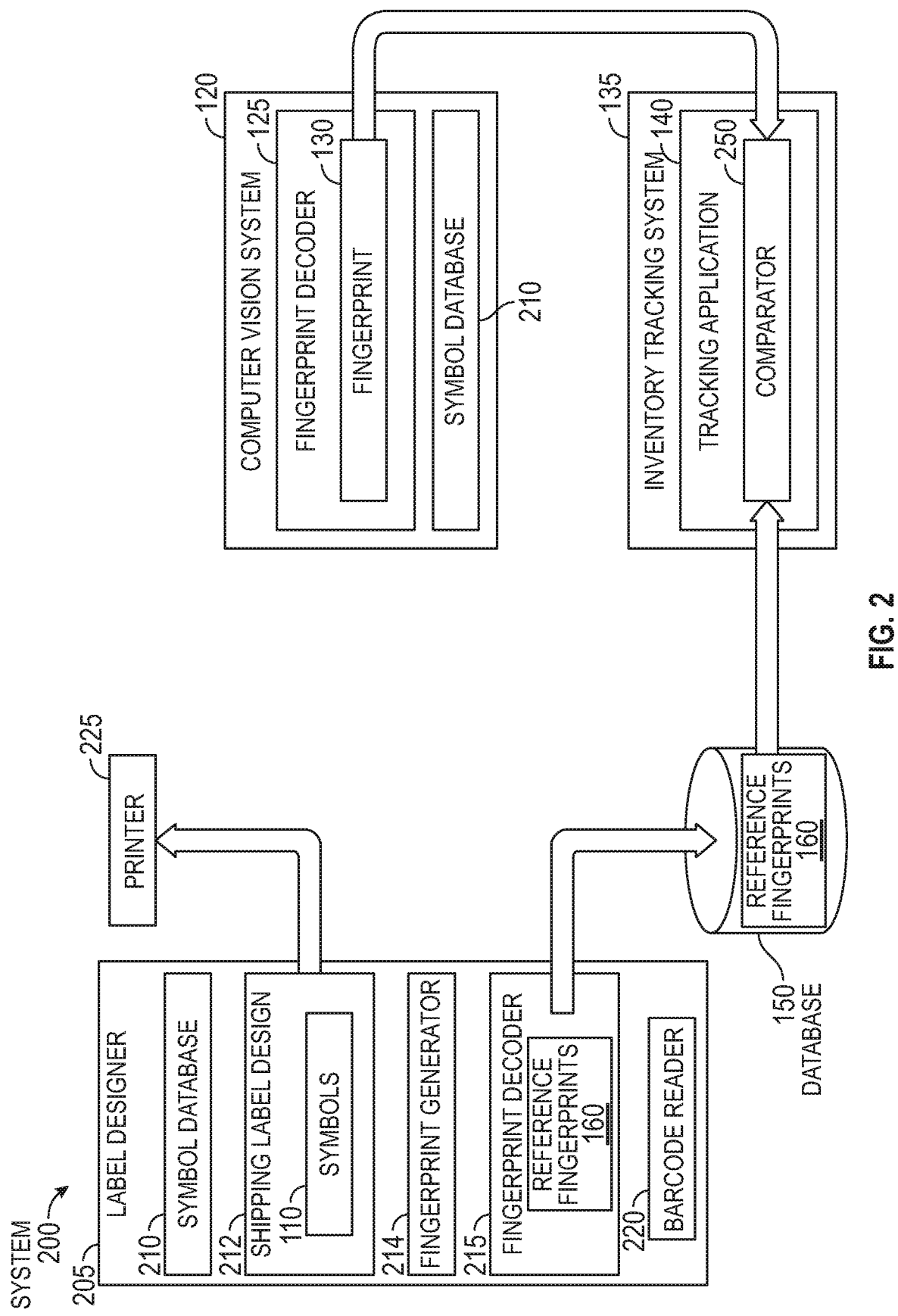
FIG. 2 is a block diagram of a system for designing shipping labels with fingerprints, according to various embodiments.

FIG. 2 is a block diagram of a system 200 for designing shipping labels 105 with fingerprints, according to various embodiments. The system 200 includes a label designer 205 (e.g., a software application) which generates the reference fingerprints 160 as the shipping label 105 is designed, or soon after it is printed. The system 200 also includes the database 150 for storing the reference fingerprints 160 provided by the label designer 205 as well as the CV system 120 for generating the fingerprints 130 as the packages proceeds through various stages or locations in the shipping facility. The system 200 also includes the inventory tracking system 135 for updating the location of the package using the fingerprint in the shipping label 105.

The label designer 205 includes a symbol database 210, a shipping label design 212, a fingerprint generator 214, a fingerprint decoder 215, and a barcode reader 220. The symbol database 210 stores a listing or dictionary of different types of symbols that the fingerprint generator 214 can choose from when inserting symbols into the shipping label design 212. In one embodiment, the fingerprint generator 214 selects random symbols from the symbol database 210. However, in another embodiment, the fingerprint generator 214 may select a particular mixture of symbols from the database 210 to help ensure the fingerprint is unique for a certain time period.

To further enhance the uniqueness of the fingerprint in the design 212, the fingerprint generator 214 may select different sizes of the symbol so that each symbol has a different size. Thus, even if two shipping labels have the same combination of symbols that are located in the same locations, the fingerprints of the labels may be different if those symbols have different sizes. For some implementations, it may be sufficient to only use different combinations of the symbols to provide unique fingerprints. For example, if a shipping facility processes less than 10,000 packages a day, then the symbol database 210 need only eight different types of symbols to uniquely identify each package (assuming each label can fit up to eight symbols).

However, due to available space in the shipping label and/or the number of packages a shipping facility processes, using only different types of symbols may be insufficient for providing unique fingerprints. Instead, the fingerprint generator 214 can vary the size of the symbols 110 in the design 212. In one embodiment, the fingerprint generator 214 may rank the symbols according to their sizes which provides another factor for generating the fingerprint. Thus, two shipping labels that have the same symbols 110 can nonetheless have different fingerprints if the symbol sizes are different.

The fingerprint decoder 215 in the label designer 205 may perform a similar process as the fingerprint decoder 125 in the CV system 120 to read or decode the reference fingerprints 160. That is, the fingerprint decoder 215 reads or decodes the produced by the fingerprint generator 214 in the shipping label design 212. The various techniques for generating and reading the fingerprints 160 and 130 are described in later figures.

Once generated, the label designer 205 transmits the reference fingerprint 160 for each shipping label design 212 to the database 150 for storage. As mentioned above, the tracking application 140 can later retrieve the reference fingerprints 160 in order to determine whether a current fingerprint 130 decoded by the fingerprint decoder 125 in the CV system 120 matches one of the reference fingerprints 160. That is, the tracking application 140 includes a comparator 250 that compares the fingerprint 130 derived from image data containing the shipping label to the reference fingerprints 160 to determine whether there is a match. If there is a match, the tracking application updates the location of the corresponding package.

In order to correlate the reference fingerprints 160 to a particular package, the label designer 220 can use the barcode reader 220 to read a barcode in the shipping label design 212 to determine ID data corresponding to the package. That is, the shipping label design 212 includes at least one barcode that identifies the package on which the shipping label is attached. By determining this ID information using the barcode reader 220, the label designer can then correlate the fingerprint generated by the symbols 110 to the package. In one embodiment, this correlation between the reference fingerprints 160 and the packages can be stored in the database 150. In any case, when the comparator 250 identifies a match between the fingerprint 130 and one of the reference fingerprints 160, the tracking application 140 can identify the package correlated to the matched reference fingerprint 160 and update that package's location.

Once the symbols 110 have been placed in the shipping label design 212 and the reference fingerprint 160 has been read, the label designer 205 can use a printer 225 to have the design 212 printed to form the physical shipping label. Although FIG. 2 illustrates generating the reference fingerprint 160 using the digital design 212 of the shipping label rather than the physical shipping label, in other embodiments, the shipping labels may first be printed and then a camera and the CV system 120 could be used to read the reference fingerprints 160 from the printed labels.

Figure 3:
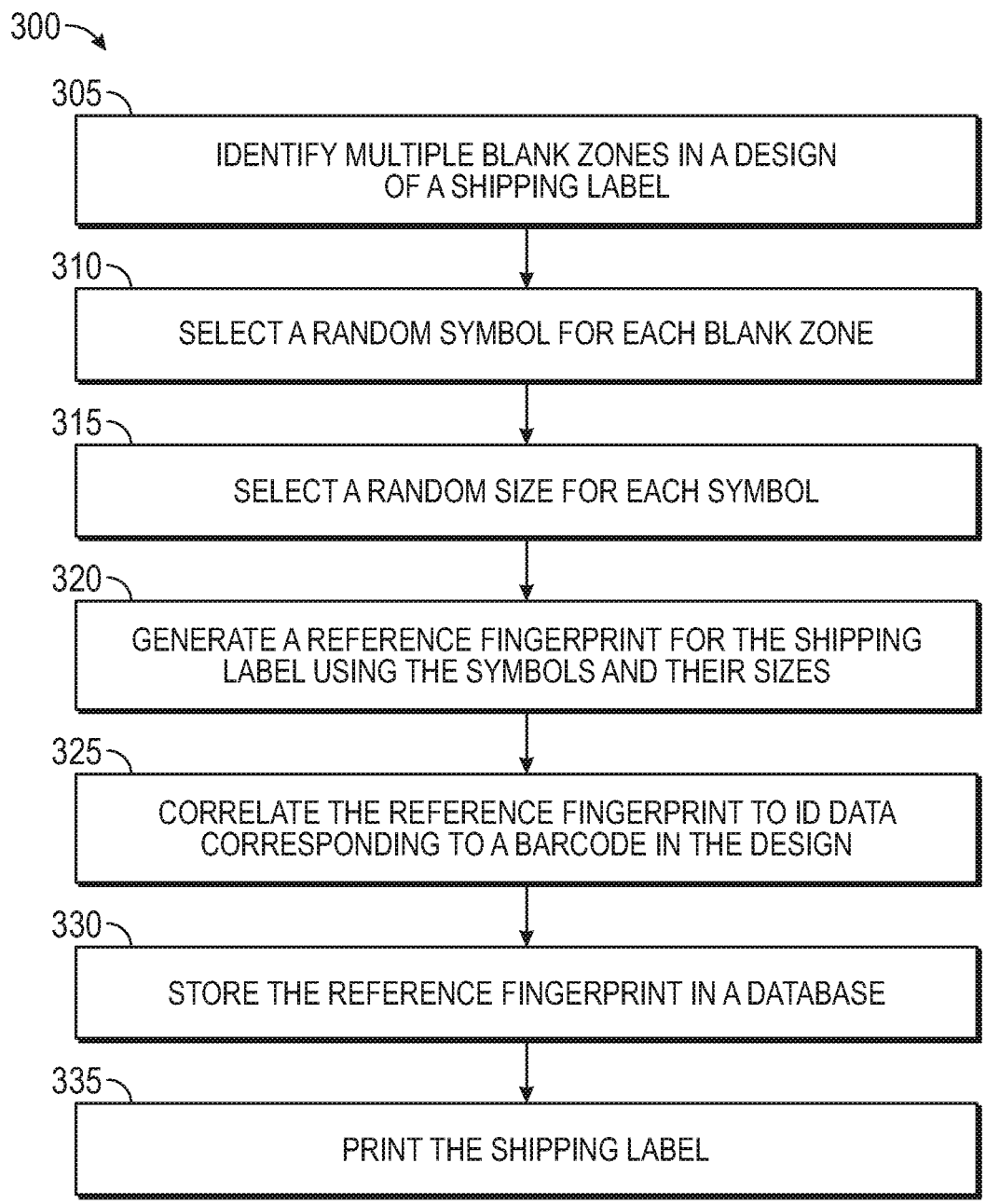
FIG. 3 is a flowchart for designing a shipping label with a fingerprint, according to various embodiments.

FIG. 3 is a flowchart of a method 300 for designing a shipping label with a fingerprint, according to various embodiments. At block 305, the label designer identifies multiple blank zones in a design of a shipping label. For example, different carriers and shipping facilities may have different requirements for shipping labels such as a size of the address, the number and types of barcodes on the shipping label, size of sorting data used for stowing or picking the package at different stages in the facility, and the like. Thus, much of the area of the shipping label design (and the format of the design) may be set or predefined. Nonetheless, there may be vacant areas in the design referred to herein as blank zones that do not include any printed text or features (e.g., addresses, barcodes, sorting information, etc.). The label designer can parse through the design to identify the blank zones and then determine whether the blank zones are large enough for a symbol used to generate a fingerprint. In another embodiment, the label designer does not actively scan the design to identify the blank zones, but can instead identify the blank zones using information provided by a system administrator that indicates which portions of the shipping label are blank zones.

Figure 4A:
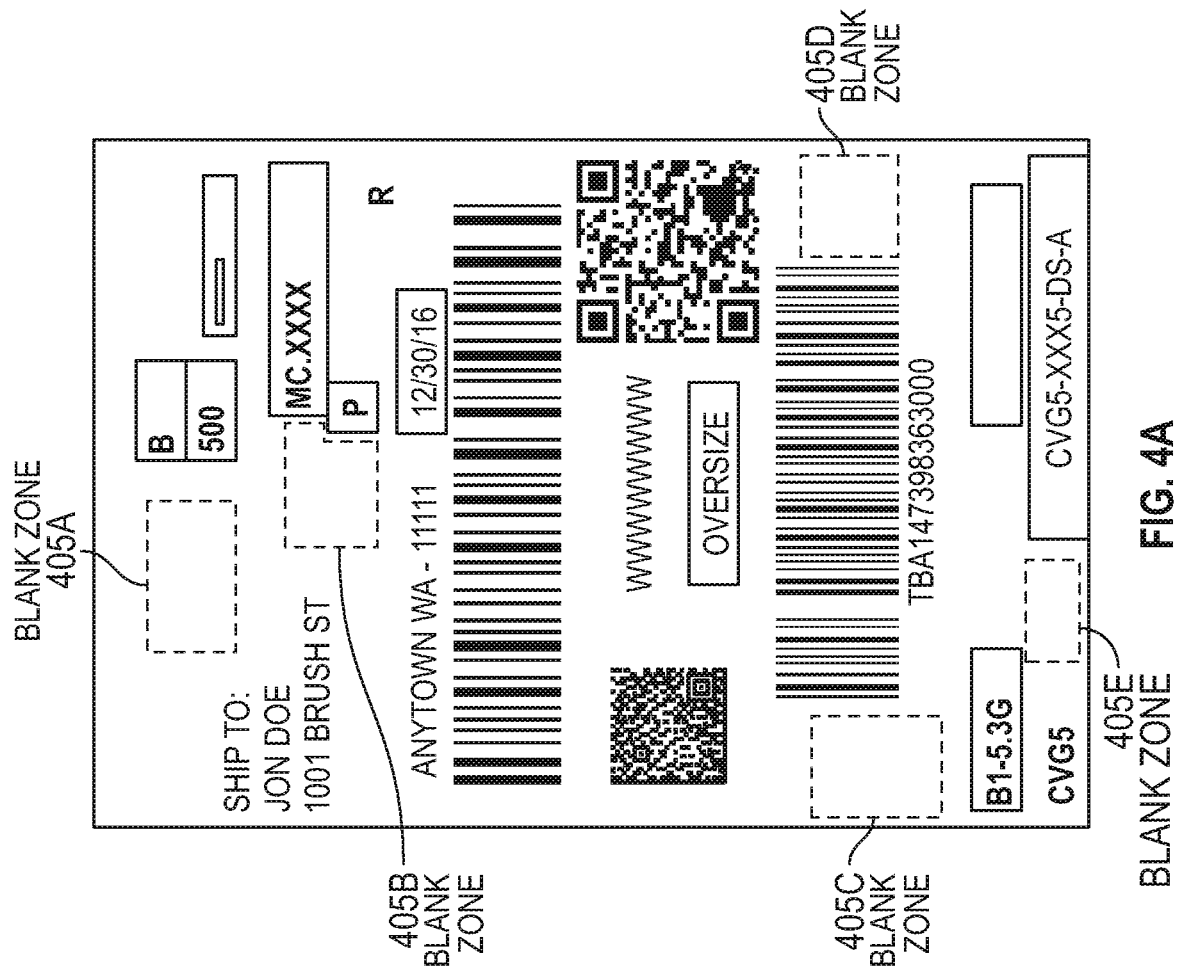
FIG. 4A illustrates blank zones in a design of a shipping label, according to various embodiments.

FIG. 4A illustrates blank zones 405 in a design of a shipping label, according to various embodiments. In this example, the shipping label design includes five blank zones: blank zones 405A-405E where there is no text or other features. That is, when the design is printed to form a shipping label, the blank zones 405 would not include any printed material and would be left the same color as the substrate of the shipping label (which is typically white).

In one embodiment, the blank zones 405 may have to have a minimum size (e.g., at least 1 cm width and 1 cm height). Further, the blank zones 405 may have a requisite buffer from other text or feature in the design. For example, some barcode readers require a buffer zone around barcodes on the shipping label so these barcodes can be read accurately. The label designer may select the boundaries of the blank zones 405 to exclude these buffer zones around the barcodes to prevent the symbols from extending into the buffer zones.

Although the blank zones 405 in FIG. 4A have generally rectangular shapes, in other examples the zones 405 could be circular, triangular, or any shape that avoid the other text or features in the design. In one embodiment, a blank zone can have multiple symbols if its size permits. Moreover, each shipping label may have a different number of blank zones. For example, the changes in the size and orientation of the printed material in the designs of the shipping labels may result in one design having four blank zones while a second design has only three blank zones.

Returning to method 300, at block 310 the label designer selects a random symbol for each blank zone. That is, regardless the number of blank zones, the label designer randomly selects a symbol from the symbol database for each zone. In one embodiment, the label designer may select a different type of symbol for each zone; however this is not a requirement. Some or all of the blank zones can have the same type of symbol.

In another embodiment, rather than selecting the symbols randomly, the label designer may select the symbols according to a predefined list of combinations. For example, the label designer may use a predefined list or a predefined algorithm for selecting which symbols are placed in the blank zones. While randomly selecting the symbols might be easier when the number of blank zones in the shipping label can change, it also means that the label designer may select a random combination of symbols that was selected for a previous shipping label (e.g., multiple shipping labels in the same day might have the same combination of symbols). However, if the label designer uses a list or algorithm for ensuring each combination of symbols is selected before the combinations are reused for more shipping labels, this may more evenly distribute the combinations and reduce the number of times in a given time period that multiple shipping labels have the same combination of symbol types.

At block 315, the label designer selects a random size for each symbol. In one embodiment, the size of the symbol is determined by the length along its largest dimension which may vary according to the type of symbol. However, in other embodiments, the size may be determined along a predefined axis (e.g., the vertical axis or horizontal axis) or based on a total area occupied by the symbol in the design.

Regardless how the size is determined, in one embodiment, the label designer ensures that each of the symbols has a different size from each other. That way, the symbols can be ordered or ranked according to their size. In one embodiment, the label designer ensures that the size of each symbol has a minimum difference from all the other symbols inserted into the design which may help later when the CV system determines the size of each of the symbols when evaluating a digital image. For example, when randomly choosing the sizes, the label designer may ensure that each of the symbols has a size that is at least 1 mm different from the size of all the other symbols—e.g., Symbol A has a size of 5 mm, Symbol B has a size of 3 mm, and Symbol C has a size of 9 mm. In another embodiment, the label designer may randomly choose sizes that have a predefined difference. For example, if the label designer inserts five symbols into the design and wants to make sure the size difference is at least 2 mm, the label designer may randomly select which of the five symbols has a 3 mm size, a 5 mm size, a 7 mm size, a 9 mm size, and an 11 mm size. Further, the size of the symbols may be limited by the size of the blank zone in which the symbol is located. For example, the label designer may not be able to put a 9 or 11 mm sized symbol in a blank zone, and thus, has to randomly select whether the symbol has a 3, 5, or 7 mm size. Thus, randomly sizing the symbols can be done using one or more constraints to make it easier for the CV system to identify the size of the symbols when reading the printed shipping label or to satisfy the size restrictions of the blank zones.

As mentioned above, the fingerprint can be generated using only one of the factors described in blocks 310 and 315 rather than both although this may impact the number of unique fingerprints that can be generated during a time period. For example, method 300 may select different types of symbols but not different sizes (i.e., the size of the symbol do not affect the fingerprint). Or the method 300 may use the same type of symbol but rely on different sizes to generate the fingerprint. One advantage of both randomly selecting the type and size of the symbol is that the method 300 can be performed on multiple label designers in parallel without the label designers having to communicate to ensure they use different fingerprints. The odds of the label designers producing the same fingerprint are very low.

Figure 4B:
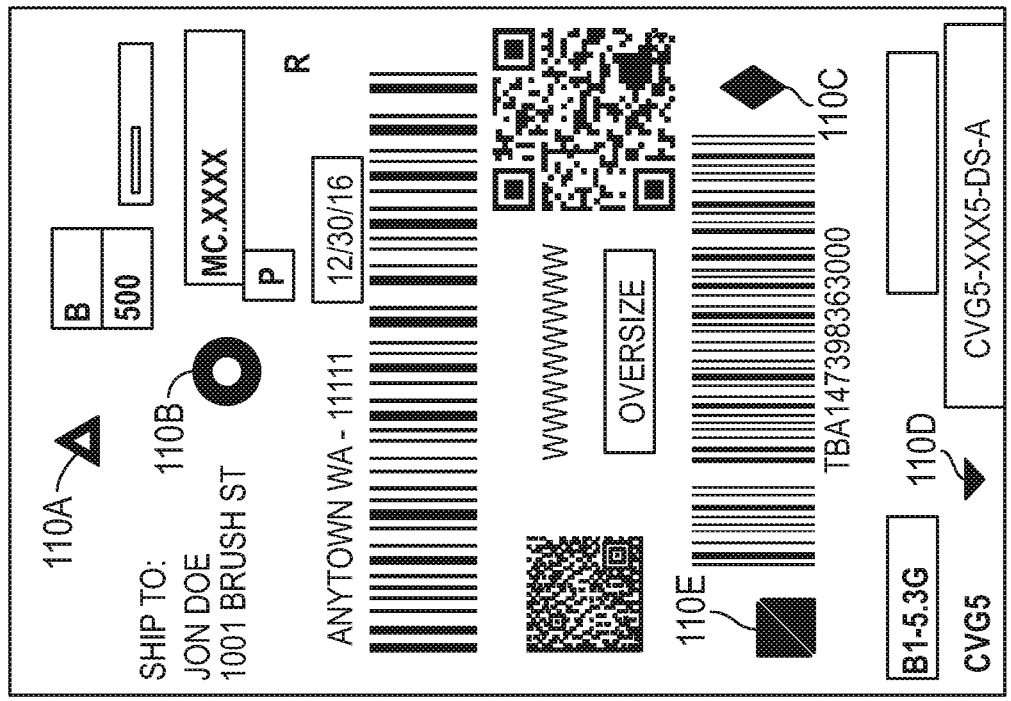
FIG. 4B illustrates placing symbols within the blank zones of the design, according to various embodiments.

FIG. 4B illustrates placing symbols 110 within the blank zones of the design, according to various embodiments. The types of symbols 110 in FIG. 4B were randomly selected and placed in the blank zones 405 illustrated in FIG. 4A. Moreover, the size of each of the symbols 110 is randomly selected so that each symbol 110 has a different size (along its longest dimension) than the other symbols 110 in the design. Moreover, the symbols 110 may be placed to provide sufficient white space between the symbols 110 and the other printable text or features in the design.

The design in FIG. 4B can be printed onto a substrate and then attached to a package as a shipping label. That is, while FIG. 4B illustrates a digital design of a shipping label, this design can be printed onto a suitable substrate to form a shipping label that is then attached to a package—e.g., a cardboard box or envelope.

Returning to method 400, at block 320 the fingerprint generator in the label designer generates a reference fingerprint for the shipping label using the symbols and their sizes. For example, the fingerprint generator identifies the symbols 110 and their corresponding sizes by evaluating the design illustrated in FIG. 4B and converts this information to form the fingerprint. The fingerprint generator also selects the locations of the symbols in the shipping label (e.g., the blank zones identified at block 305). Reading or decoding the fingerprint produced by the fingerprint generator can be done by evaluating the design of the shipping label (which is digital data) rather than after the shipping label has been printed. The details for decoding or reading the fingerprints are described later in FIG. 5.

At block 325, the label designer correlates the reference fingerprint to ID data corresponding to a barcode in the shipping label design. As shown in FIG. 2, the label designer includes a barcode reader which can identify and decode the barcodes in the design of the shipping label. However, in other embodiments a barcode reader can be omitted since the information to generate the barcode for the label is already in the shipping label design. In any case, at least one of those barcode corresponds to ID data that identifies the package to which the shipping label is affixed. For example, the barcode may be provided by the inventory tracking system which, when decoded, has an ID of the package which can be used to track the package. The label designer can then correlate the reference fingerprint to the package ID.

At block 330, the label designer stores the reference fingerprint in a database. The reference fingerprint can then be retrieved from the database and compared to fingerprints generated from captured digital images of the shipping label as described below. In addition to storing the reference fingerprints in the database, the label designer can also store the ID data of the package in the database.

At block 335, a printer prints the shipping label. For example, the printer may be part of a station in the shipping facility that prints the shipping labels and then attaches the labels to the corresponding packages. The ID contained in the barcode of the shipping label is the ID for the package to which the shipping label is affixed.

Figure 5:
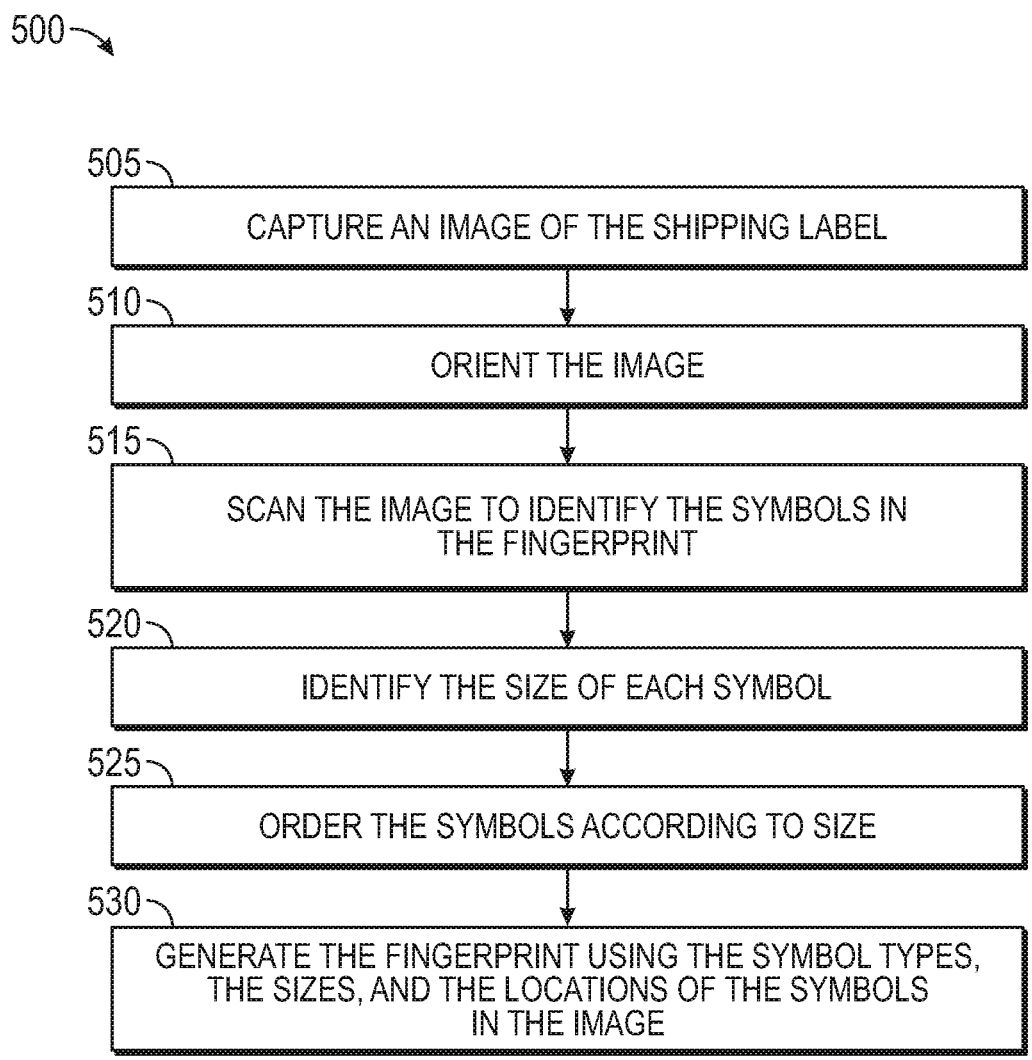
FIG. 5 is a flowchart for decoding the fingerprint using the symbols in a shipping label, according to various embodiments.

FIG. 5 is a flowchart of a method 500 for decoding the fingerprint using the symbols in a shipping label, according to various embodiments. While FIG. 3 illustrates a method 300 for designing a shipping label, the method 500 describes techniques for identifying a fingerprint from a printed shipping label.

At block 505, a camera captures an image of the shipping label. A shipping facility may have cameras arranged at waypoints or stages which capture images as the packages pass underneath or enter the stages. Advantageously, using the techniques described herein, the cameras can be disposed farther away from the packages than would otherwise be possible if the camera has to read a barcode on the shipping label and still generate image data that can be processed to identify the fingerprint in the shipping label. This may result in using less expensive cameras that can be mounted a safe distance away from a conveyor system moving the packages (e.g., more than 10 feet above the package).

At block 510, the CV system receives the digital image from the camera and orients the image so the image can be processed. For example, when capturing the image, the package may have rotated relative to the camera so that the shipping label is skewed or rotated in the image rather than being vertically and horizontally aligned in the image. Using fiducials on the shipping label, the CV system can identify the shipping label within the image and rotate the image so that the shipping label is in a desired orientation.

In some embodiments, changing the orientation of the image, and more particularly, the shipping label, is advantageous to properly identify the types of the symbols forming the fingerprint of the shipping label. For example, when oriented vertically as shown in FIG. 1, the symbol 110C in the shipping label 105 is a diamond shape. However, if the shipping label were rotated 45 degrees to the right or left, the diamond shape instead appears more like a rectangle or parallelogram. Thus, orienting the image to achieve a desired orientation of the shipping label may better enable to the CV system to correctly distinguish between different types of symbols. However, in other embodiments, it may not be necessary to reorient the image before identifying the symbols. For example, the symbols database may include only symbols that appear the same regardless of the orientation of the shipping label in the image such as the symbol 110B in FIG. 1.

At block 515, the CV system scans the image to identify the symbols in the fingerprint. In one embodiment, the CV system identifies a reference point in the shipping label (e.g., the top left corner) and then rasters through the image to identify the symbols. However, the embodiments herein are not limited to any particular type of scanning technique for identifying the symbols.

In one embodiment, the CV system has access to the same symbol database used by the label designer to select the symbols. Thus, the CV system can compare features it finds in the shipping label to the symbols in the symbol database. When there is a match, the CV system knows the identified object is a symbol that forms part of the fingerprint rather than being part of some other feature in the shipping label (e.g., a 2D barcode or text).

At block 520, the CV system identifies the size of each symbol of the fingerprint. In one embodiment, the CV system identifies the largest dimension of the symbol which determines the size of the symbol. In this case, the dimension used to determine the size of the symbol can vary depending on the symbol type. In another embodiment, the size is determined by the value of the same dimension for all the symbols (e.g., the horizontal or vertical dimension). In yet another embodiment, the size may be an area or space the symbol occupies in the shipping label.

At block 525, the CV system orders the symbols according to their size. As mentioned above, when designing the shipping label, the label designer may ensure each of the symbols has a different size. Thus, when measured by the CV system, the symbols can be ordered by their sizes without any ties. Or the symbols may be ordered with reference to the label—e.g., the top left corner of the label.

Figure 6:
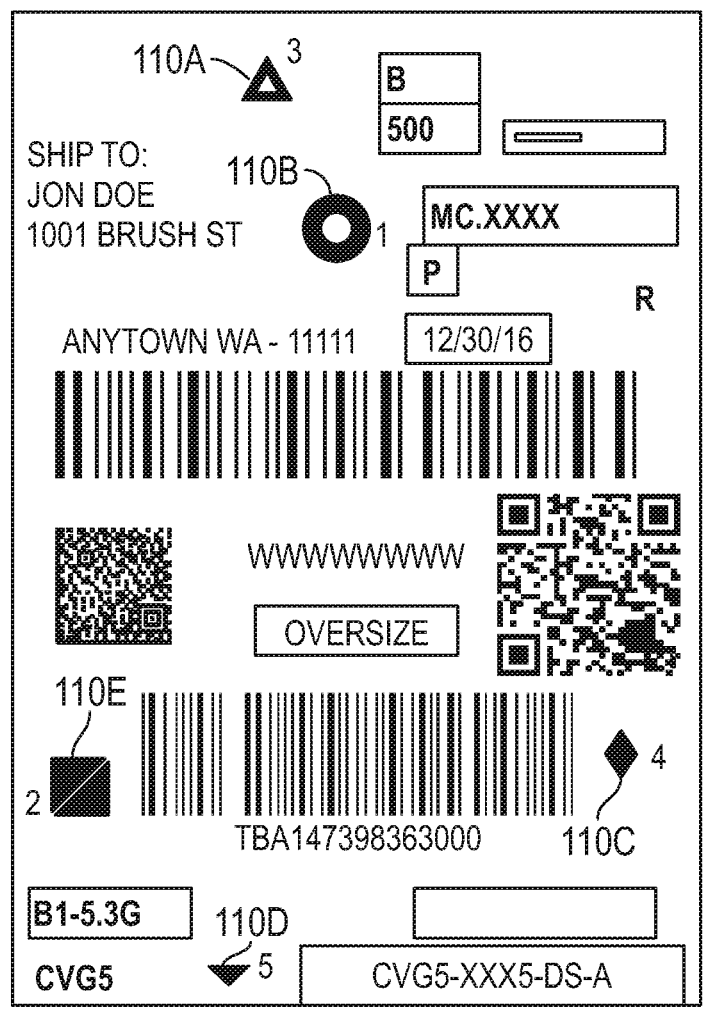
FIG. 6 is a shipping label where the symbols are ordered based on size, according to various embodiments.

FIG. 6 is a shipping label 105 where the symbols 110 are ordered based on size, according to various embodiments. In this example, the symbol 110B is the largest symbol (with a rank of 1), the symbol 110E is the second largest symbol, the symbol 110A is the third largest symbol, the symbol 110C is the fourth largest symbol, the symbol 110D is the smallest symbol.

Returning to the method 500, at block 530 the fingerprint decoder in the CV system generates (e.g., decodes) the fingerprint using the symbol types, the sizes, and the locations of the symbols in the image. That is, the CV system identifies the type of each symbol, the size of each symbol, and the locations of the symbols within the shipping label. From this, the fingerprint decoder can generate a data structure which serves as the fingerprint for the shipping label.

Figures 7, 8:
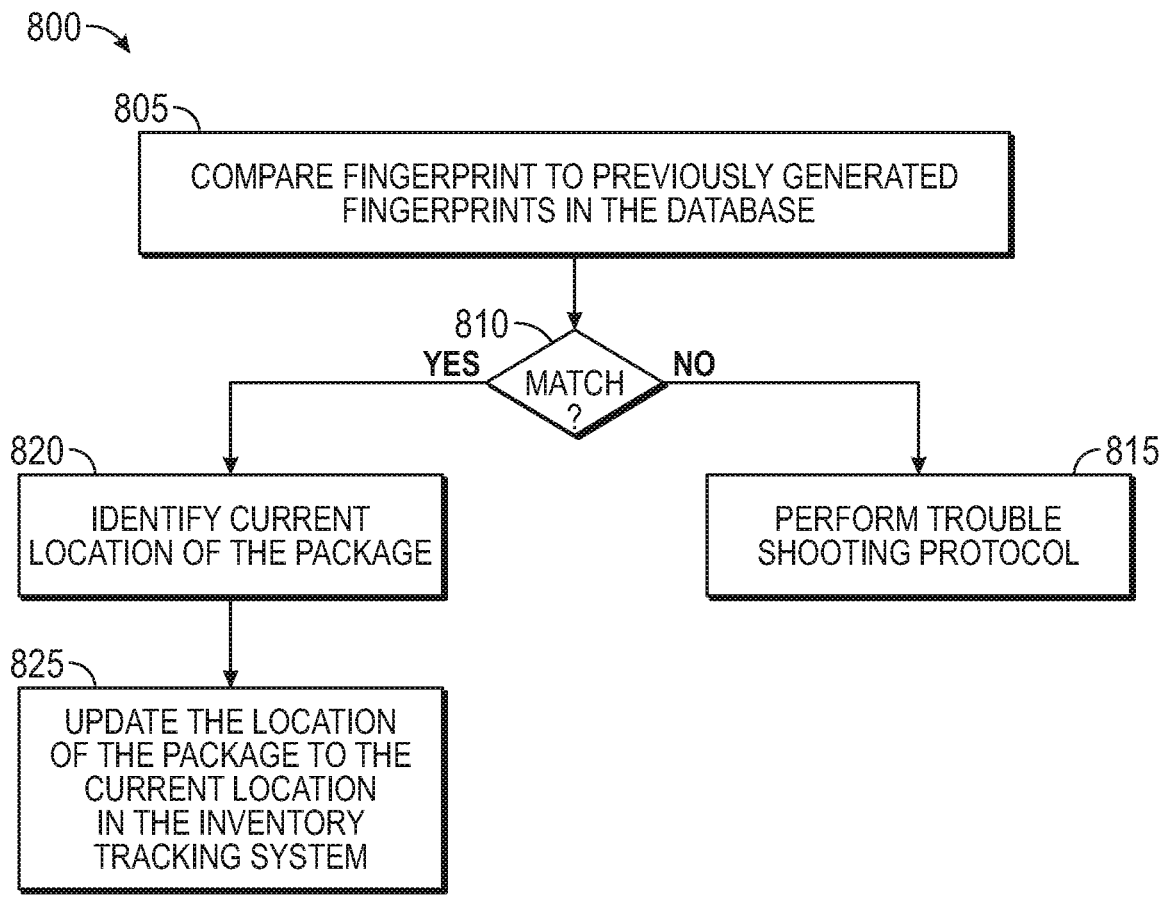
FIG. 7 is a data structure representing a fingerprint of a shipping label, according to various embodiments.
FIG. 8 is a flowchart for using the fingerprint of a shipping label to track a package, according to various embodiments.

FIG. 7 is a data structure representing a fingerprint 700 of a shipping label, according to various embodiments. The data structure in this example is a table 705 where the left column stores the symbol type of each symbol identified in the digital image, the second leftmost column orders (or ranks) the symbols based on size, and the rightmost column stores the locations of the symbols in the shipping label.

While the table 705 can store the rank (rather than the measured size value), in other embodiments, the table 705 may store a module size or pixel size of the measurement which are normalized values. Thus, the images captured by different cameras that are arranged at different distances from the shipping values can still be compared. Put differently, the values of the size stored in the table 705 can be normalized so that the sizes of the symbols measured from images captured at different distances can be compared. In one example, rather than using the ranking, the table 705 can include the normalized values of the symbol sizes.

Including the locations of the symbols can also increase the number of unique fingerprints available for a period of time. That is, the label designer may use the same set of symbols (and assign them the same size) as in another shipping label but put the symbols at different locations or blank zones in the shipping label, thereby creating a different fingerprint. That is, even if the number of blank zones and their locations in the shipping label do not vary much between the shipping labels, the same set of symbols can be reused by rearranging where the symbols are disposed in the shipping labels.

Moreover, the table 705 is just one example of organizing data to identify the fingerprint 700. The data forming the fingerprint (e.g., symbol type, size, and location) can be arranged in various types of formats (e.g., an array). In another example, the symbols types, rankings, and locations can be assigned numerical values which are then combined to form a single numerical value which represents the fingerprint for the shipping label.

FIG. 8 is a flowchart of a method 800 for using the fingerprint of a shipping label to track a package, according to various embodiments. In one embodiment, the method 800 begins after method 500 where the fingerprint decoder in the CV system has generated a fingerprint for the shipping label. At block 805, the comparator in the tracking application compares the fingerprint to previously generated fingerprints in the database (i.e., the reference fingerprints). For example, the comparator may compare the table 705 in FIG. 7 to corresponding tables for reference fingerprints which are stored in the database. If the table 705 has the same values (i.e., the same symbol types, same ranking, and same locations) as a table stored in the database, the comparator indicates there is a match. Identifying a match indicates to the tracking application that this shipping label is currently being tracked by the inventory tracking system.

If at block 810 the comparator does not identify a previously generated fingerprint that matches the fingerprint received from the CV system, the method proceeds to block 815 where the inventory tracking system performs a troubleshooting protocol. For example, the shipping label may have become damaged and needs to be replaced. In another example, the troubleshooting protocol may instruct the camera that captured image a chance to capture another image. In yet another example, an associate may hold the package closer to the camera to determine whether a new, better image enables the system to match the fingerprint in the shipping label to one of the reference fingerprints.

However, assuming the comparator does identify a match at block 810, the method 800 proceeds to block 820 where the tracking application identifies the current location of the package. For example, if the image used to decode the fingerprint was captured by a camera at Stage A or Waypoint A, then the tracking application determines that is the current location of the package.

At block 825, the tracking application updates the location of the package in the inventory tracking system to the current location. As mentioned above, the fingerprint is correlated with an ID of the package (which may have been retrieved by reading a barcode in the shipping label). Thus, by matching the fingerprint to a previously generated fingerprint in the database, the tracking application can also identify the ID of the package corresponding to the matched fingerprint. Using this correlation, the tracking application can change the location of the identified package to the current location.

Figure 9:
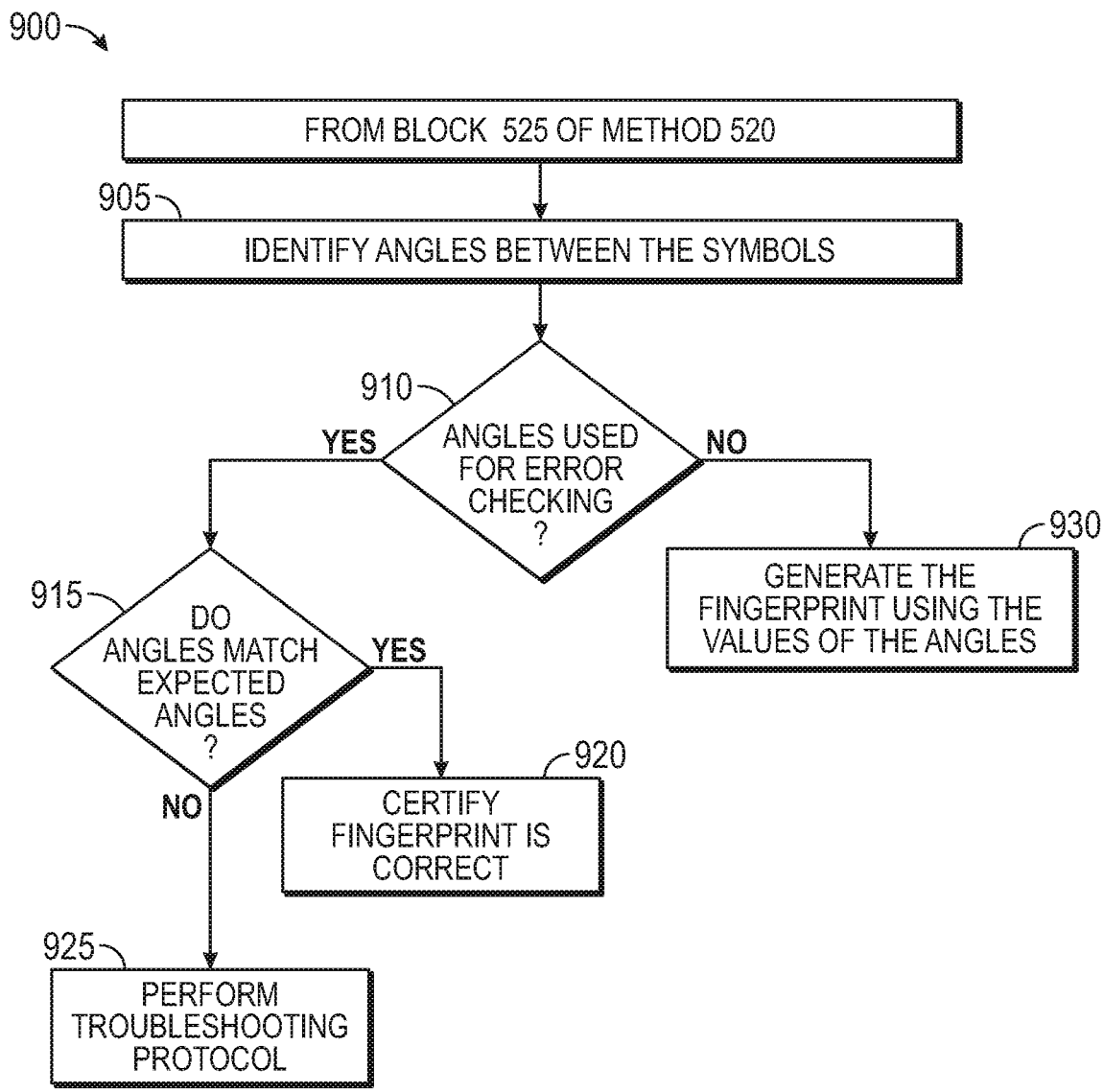
FIG. 9 is a flowchart for using angles between symbols when reading a shipping label, according to various embodiments.

FIG. 9 is a flowchart of a method 900 for using angles between symbols when reading a shipping label, according to various embodiments. The method 900 begins after block 525 of method 520. For example, the method 900 may begin before a fingerprint has been generated.

At block 905, the CV system identifies angles between the identified symbols. For example, the angles may be in reference to the upwards direction in FIG. 4B (assuming the shipping label has been re-oriented) which has a reference angle of zero. For example, the CV system may raster through the shipping label in a predefined manner so that the symbols are identified in a certain order. Using that order, the CV system can identify the angle between the first identified symbol and the second identified symbol, the angle between the second identified symbol and the third identified symbol, and so forth. For example, the CV system may measure four internal angles (e.g., 55°|135°|120°|85) between the symbols relative to the reference angle.

At block 910, the CV system determines whether the angles are used for error checking or to decode the fingerprint. For example, a mode or setting of the CV system can be changed to indicate how the angles are to be used. This mode could be set once (and then never changed) or may be changed dynamically by a system administrator.

If the angles are used for generating the fingerprint, the method proceeds to block 930 where the fingerprint decoder decodes the fingerprint using the measured angles. For example, the table 705 in FIG. 7 can have an additional column that includes the angles, thereby increasing the number of unique fingerprints that can be assigned. In another embodiment, the angles can be summed to generate metadata regarding the fingerprint. Using the example angles provided above, these angles can be combined to form an encoded number: 5513512085.

However, rather than using the angles to generate fingerprint data, the angles can be used to perform an error checking function. In that case, the method 915 proceeds to block 915 where the CV system determines whether the angles match expected angle values. For example, the shipping labels may have blank zones in the same positions, and thus, the symbols should have the same relative position regardless of the shipping label. Thus, if the measured angles do not match the expected angle values, this means the CV system did not correctly detect the symbols in the fingerprint—e.g., the CV system detected a wrong symbol or missed a symbol. The method then proceeds to block 925 to perform a troubleshooting protocol.

However, if the measured angles match the expected angle values, this serves as a check that the CV system correctly identified all the symbols. At block 920, the fingerprint decoder can decode the fingerprint as discussed above which is then certified as being correct. In this manner, the angles can be used in an error checking process to certify a fingerprint before or after the fingerprint is generated.

Figure 10:
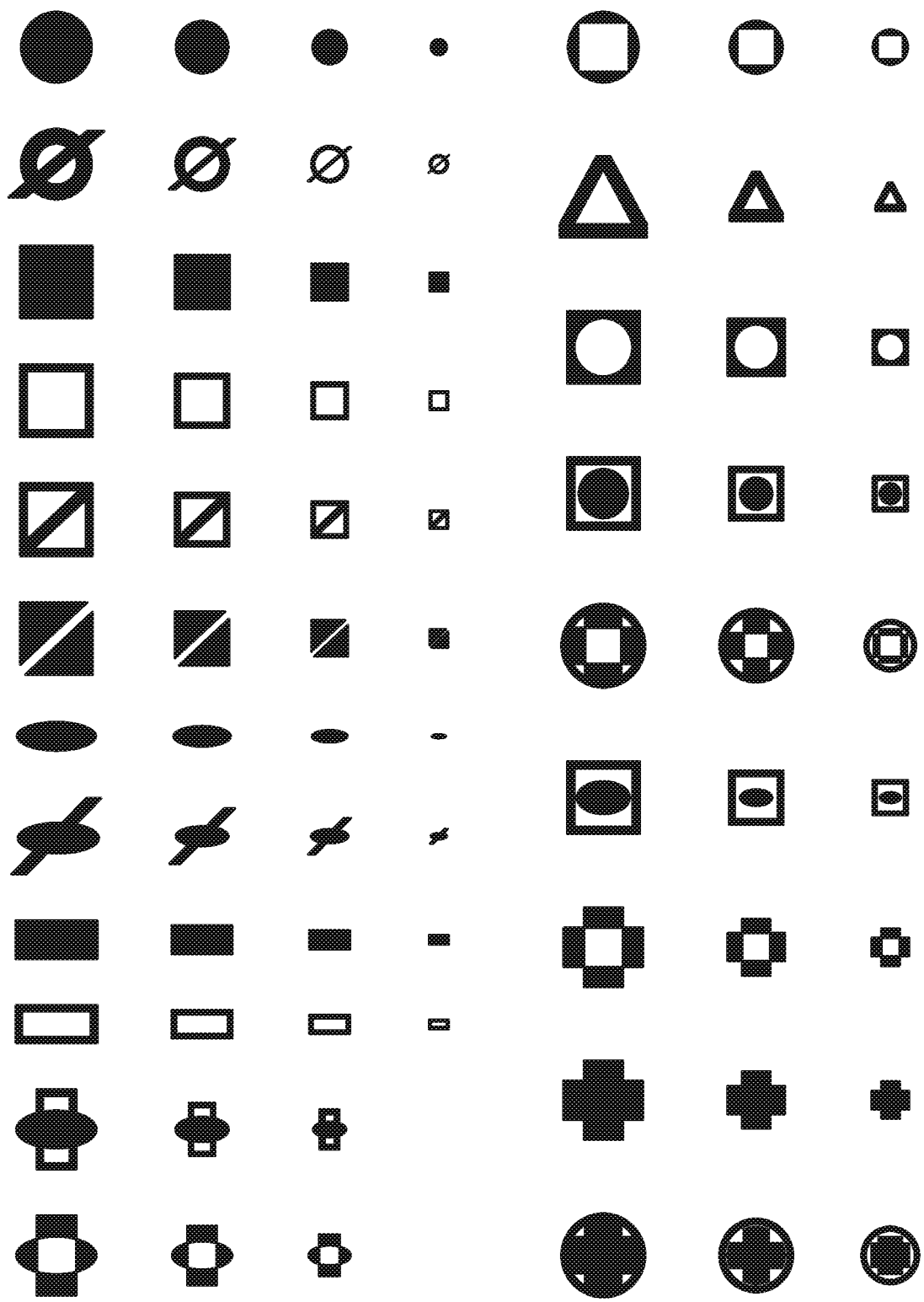
FIG. 10 illustrates example symbols that can be used to generate a fingerprint on a shipping label, according to various embodiments.

FIG. 10 illustrates example symbols that can be used to generate a fingerprint on a shipping label, according to various embodiments. Moreover, FIG. 10 illustrates that the size of these symbols can be altered as discussed above so that the symbols can be ranked or compared according to size. Further, the symbols in FIG. 10 are a non-exhaustive list of suitable symbols that could be used in the symbol database. In one embodiment, any symbol could be used so long as the symbol is not too similar in shape to objects in other features in the shipping label such as the fiducials in the 2D barcode or the shape of letters (e.g., a plus sign may be too similar to a lower case "t" to be used as a symbol for generating the fingerprint).

Figure 11:
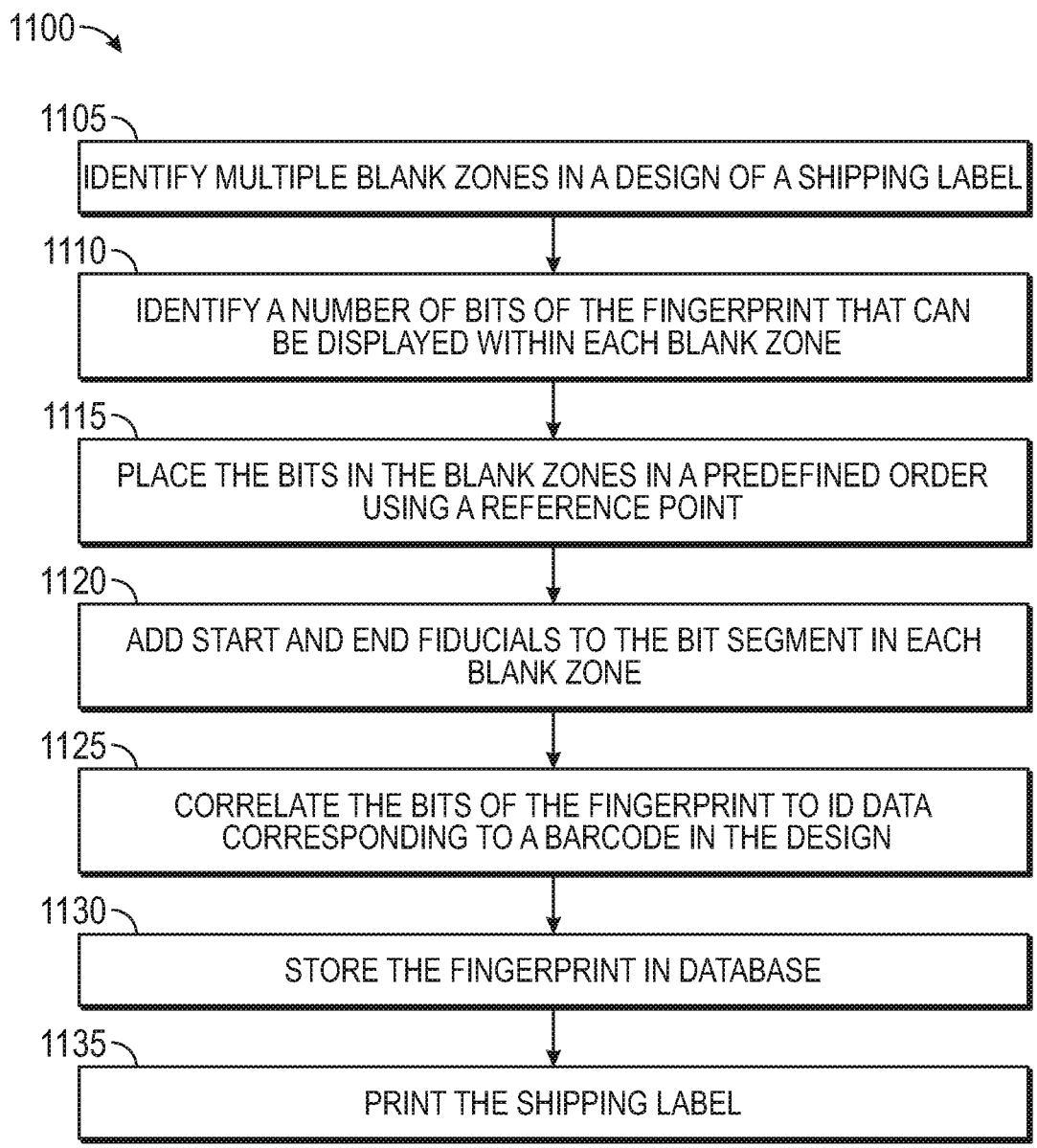
FIG. 11 is a flowchart for designing a shipping label with a fingerprint, according to various embodiments.

FIG. 11 is a flowchart of a method 1100 for designing a shipping label with a fingerprint, according to various embodiments. The method 1100 varies from the method 300 in that the method 1100 uses bit segments for generating the fingerprint rather than symbols. Generally, the symbols and the bit segments are examples of graphics that can be inserted into the blank zones of the design of a shipping label to form a fingerprint.

At block 1105, the label designer identifies multiple blank zones in a design of a shipping label. This block may be performed using any of the techniques discussed in block 305 of the method 300.

At block 1110, the label designer identifies a number of bits of the fingerprint that can be displayed within each blank zone. For example, the label designer may assign each new shipping label a unique 32 bit fingerprint value. However, a blank zone may only be able to display a portion of the 32 bit values—referred to herein as a bit segment. For instance, a first blank zone has a width sufficient to contain a five bit segment, a second blank zone can contain a ten bit segment, a third blank zone can contain an eleven bit segment, and a fourth blank zone can contain a six bit segment. When combined, the four bit segments have all the data in the 32 bit fingerprint, but that data is spread across the blank zones in the shipping label.

Figure 12:
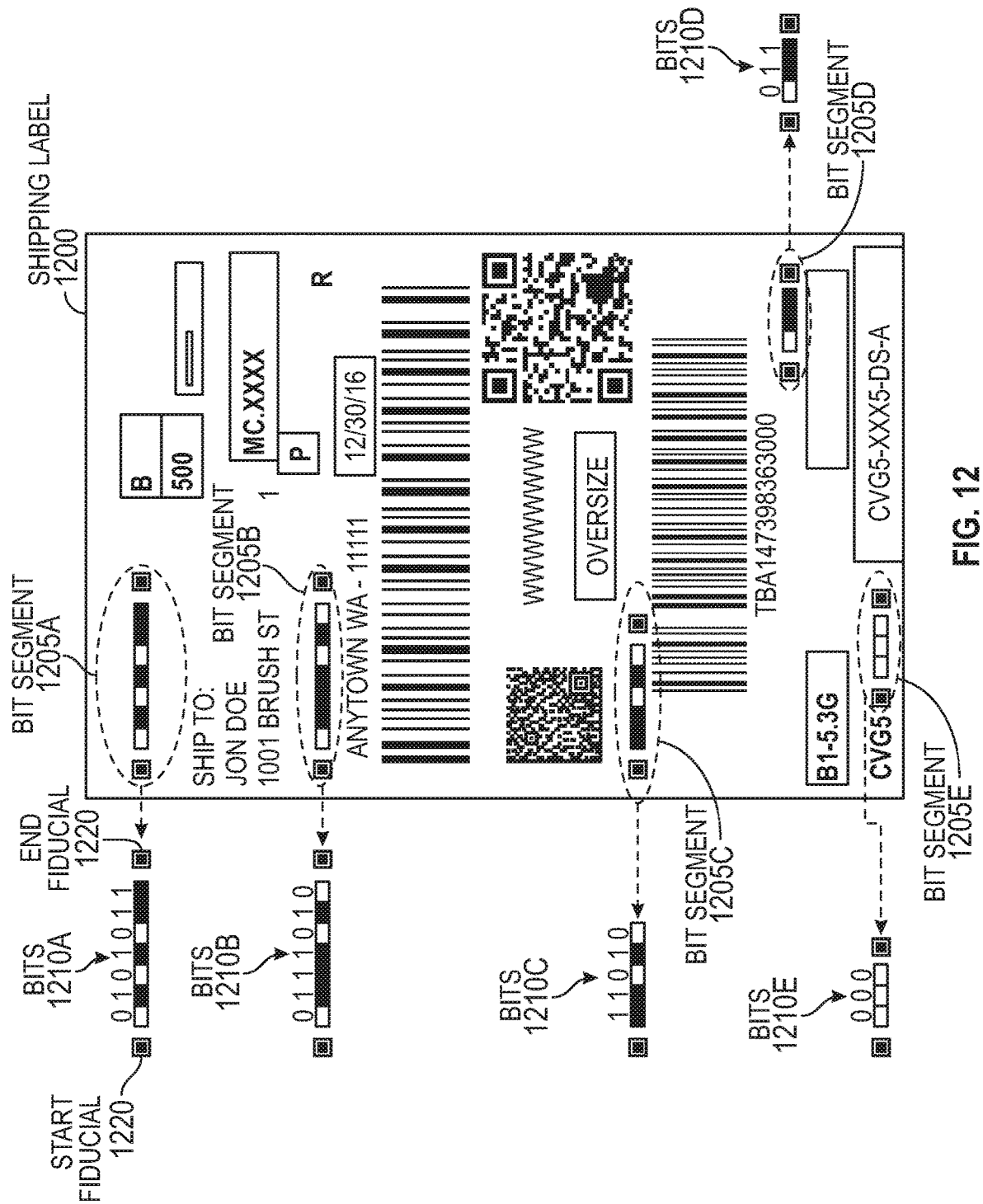
FIG. 12 illustrates placing bit segments for generating a fingerprint in a shipping label, according to various embodiments.

FIG. 12 illustrates placing bit segments 1205 for generating a fingerprint in a shipping label 1200, according to various embodiments. In this example, each bit segment 1205 is placed within a previously identified blank zone in the shipping label 1200. The size of the segments 1205 vary according to the size (e.g., width) of the blank zone. Each bit segment 1205 has a corresponding blow out that illustrates the number of bits (and their values). For example, the bit segments 1205A and 1205B each have seven bits as illustrated by bits 1210A and 1210B, the bit segment 1205C has five bits 1210C, and the bit segments 1205D and 1210E have three bits 1210D and 1210E.

In one embodiment, the label designer may alter the size of the bits (which are represented by the white and black blocks) so that the entire fingerprint can be placed within the blank zones. For example, there may be a minimum size that each of the colored blocks representing the bits should be for the CV system to be able to read the bits. If after placing the bit segments in the blank zones there are extra blank zones or extra space in one of the blank zones, the label designer may increase the size of the blocks in one or more of the blank zones. For example, if the label designer can place all 64 bits of a fingerprint value in the blank zones and still have one extra blank zone, the label designer may increase the size of the blocks in all or some portion of the blank zones which may force some of the bits to now be placed in the extra blank zone. Altering the size of the blocks in the bit segments 1205 to better utilize the space in the blank zones can result in larger block sizes which are easier for the CV system to detect and read later using captured images.

Returning to the method 1100, at block 1115 the label design places the bits in the blanks zones in a predefined order using a reference point. For example, the label design may select the blank zone closest to a reference point—e.g., the top left corner of the shipping label—and place the first bit segment in that blank zone. The first bit segment may start from the most significant bit or the least significant bit (e.g., bits [0-5] or bits [32-27]). The next bit segment is then placed in the blank zone that is the next closest to the reference point, and so forth until the label designer has placed all the bits in the fingerprint in the blank zones. Using FIG. 12 as an example, bits [0-6] of the fingerprint may be stored in the bit segment 1205A, bits [7-13] are stored in the bit segment 1205B, bits [14-18] are stored in the bit segment 1205C, bits [19-21] are stored in the bit segment 1205D, and bits [22-24] are stored in the bit segment 1205E.

When reading a shipping label to generate or decode the fingerprint, the CV system rasters through the captured image in the same manner in which the label designer assigned the bits in the bit segments. Put differently, the CV system reads the bits in the same order the label designer assigned the bits so that the CV system can merge or combine the bits in the proper order to generate the original fingerprint value.

In another embodiment, rather than rastering through the captured image in the same manner, the CV system could use a different technique to ensure the bit segments are combined or merged in the intended order. For example, the bit segments may each have different sizes (e.g., different height dimension) where ranking the segments using the size indicates the order in which the bit segments should be combined to identify the value of the fingerprint.

At block 1120, the label designer adds start and end fiducials to the bits (i.e., the bit segment) in each blank zone. Examples of these fiducials are illustrated by the start fiducial 1215 and the end fiducial 1220 in FIG. 12; however, other types of symbols can be used. These fiducials 1215 and 1220 indicate to the CV system as it rasters through a line, where to begin looking for the colored blocks representing the bits 1210 and then where to stop looking for the bits 1210. The CV system continues to raster though the shipping label row-by-row (or line-by-line) until again identifying another start fiducial.

While FIG. 12 illustrates using different colors to represent bits (e.g., white represents a logical one, while black represents a logical zero), in other embodiments different intensity values can be used. In general, the boxes can have different shades (e.g., different colors or different intensity values of the same color) to represent the different bits in the value of the fingerprint.

At block 1125, the label designer correlates the bits of the fingerprint to ID data corresponding to a barcode in the design. This block can perform the same techniques as discussed with block 325 in the method 300.

At block 1130, the label designer stores the fingerprint in the database as a reference fingerprint. Thus, like when using symbols as the fingerprint, an inventory tracking system can compare the bits read from a shipping label with the bits of the reference fingerprints stored in the database to identify a match. Once a match is identified, the inventory tracking system can update the location of the package on which the shipping label is affixed.

At block 1135, the label designer provides the shipping label design to the printer which can print the shipping label using the design.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   identifying a plurality of blank zones in a design of a shipping label;
   randomly selecting a symbol for each of the plurality of blank zones;
   randomly selecting a size for each of the selected symbols;
   decoding a reference fingerprint from the design of the shipping label based on the selected symbols and the selected sizes of the selected symbols;
   correlating the reference fingerprint to ID data corresponding to a package to which the shipping label is affixed; and
   printing the shipping label based on the design.

2. The method of claim 1, wherein randomly selecting the size for each of the selected symbols comprises:
   selecting a different size for each of the selected symbols.

3. The method of claim 1, wherein correlating the reference fingerprint to the ID data corresponding to the package comprises:
   identifying, before the shipping label is printed, barcode data in the design of the shipping label comprising the ID data corresponding to the package,
   wherein the method comprises:
   storing the reference fingerprint and the ID data in a database, wherein the database stores a plurality of reference fingerprints each corresponding to a different shipping label.

4. The method of claim 1, wherein decoding the reference fingerprint comprises:
   ranking the selected symbols according to their selected sizes;
   identifying the types of the selected symbols; and
   storing the ranking of the selected symbols and the types of the selected symbols in a data structure representing the reference fingerprint.

5. The method of claim 4, wherein decoding the reference fingerprint comprises:
   identifying locations of the selected symbols in the design; and
   storing the locations of the selected symbols in the data structure.

6. A method, comprising:
   identifying a plurality of blank zones in a design of a shipping label;
   selecting a graphic for each of the plurality of blank zones;
   generating a reference fingerprint for the shipping label based on the selected graphics;
   correlating the reference fingerprint to ID data corresponding to a package to which the shipping label is affixed; and
   printing the shipping label based on the design.

7. The method of claim 6, wherein correlating the reference fingerprint to the ID data corresponding to the package comprises:
   identifying, before the shipping label is printed, barcode data in the design of the shipping label comprising the ID data corresponding to the package,
   wherein the method comprises:
   storing the reference fingerprint and the ID data in a database, wherein the database stores a plurality of reference fingerprints each corresponding to a different shipping label.

8. The method of claim 6, wherein the selected graphics include a plurality of symbols, wherein selecting the graphic for each of the plurality of blank zones comprises:
   selecting a symbol from the plurality of symbols for each of the plurality of blank zones, wherein the plurality of symbols are selected from a predefined symbol database; and
   selecting sizes of the symbols such that each of the symbols has a different size.

9. The method of claim 8, generating the reference fingerprint comprises:
   ranking the symbols according to their sizes;
   identifying types of the symbols; and
   storing the ranking of the symbols and the types of the symbols in a data structure representing the reference fingerprint.

10. The method of claim 9, wherein generating the reference fingerprint comprises:
    identifying locations of the symbols in the design; and
    storing the locations of the symbols in the data structure.

11. The method of claim 6, wherein the selected graphics include a plurality of symbols, wherein selecting the graphic for each of the plurality of blank zones comprises:
    selecting a symbol from the plurality of symbols for each of the plurality of blank zones, wherein the plurality of symbols are selected from a predefined symbol database, and
    wherein generating the reference fingerprint comprises:
    ranking the symbols according to their order in the design when disposed in the plurality of blank zones.

12. The method of claim 6, wherein the selected graphics include a plurality of bit segments, wherein selecting the graphic for each of the plurality of blank zones comprises:
    identifying a number of bits of a bit value representing the reference fingerprint that can be stored in each of the plurality of blank zones, wherein the identified numbers of bits various according to a size of each of the plurality of blank zones; and
    placing the identified numbers of bits in each of the plurality of blank zones, wherein the identified numbers of bits form the plurality of bit segments that are different chucks of the bit value of representing the reference fingerprint.

13. The method of claim 12, further comprising:
adding start and end fiducials to each of the plurality of bit segments.

14. The method of claim 12, wherein generating the reference fingerprint comprises:
selecting the bit value representing the reference fingerprint.

15. A method, comprising:
providing a plurality of blank zones in a design of a shipping label;
selecting a graphic for each of the plurality of blank zones;
generating a reference fingerprint based on the selected graphics;
correlating the reference fingerprint to a package to which the shipping label is affixed; and
printing the shipping label with the selected graphics.

16. The method of claim 15, wherein correlating the reference fingerprint to the package comprises:
identifying, before the shipping label is printed, barcode data in the design of the shipping label comprising ID data corresponding to the package,
wherein the method comprises:
storing the reference fingerprint and the ID data in a database, wherein the database stores a plurality of reference fingerprints each corresponding to a different shipping label.

17. The method of claim 15, wherein the selected graphics include a plurality of symbols, wherein selecting the graphic for each of the plurality of blank zones comprises:
selecting a symbol from the plurality of symbols for each of the plurality of blank zones, wherein the plurality of symbols are selected from a predefined symbol database; and
selecting sizes of the symbols such that each of the symbols has a different size.

18. The method of claim 17, generating the reference fingerprint comprises:
ranking the symbols according to their sizes;
identifying types of the symbols; and
storing the ranking of the symbols and the types of the symbols in a data structure representing the reference fingerprint.

19. The method of claim 18, wherein generating the reference fingerprint comprises:
identifying locations of the symbols in the design; and
storing the locations of the symbols in the data structure.

20. The method of claim 15, wherein the selected graphics include a plurality of symbols, wherein selecting the graphic for each of the plurality of blank zones comprises:
selecting a symbol from the plurality of symbols for each of the plurality of blank zones, wherein the plurality of symbols are selected from a predefined symbol database, and
wherein generating the reference fingerprint comprises:
ranking the symbols according to their order in the design when disposed in the plurality of blank zones.

* * * * *

UNITED STATES PATENT AND TRADEMARK OFFICE
CERTIFICATE OF CORRECTION

PATENT NO. : 10,915,804 B1
APPLICATION NO. : 16/278662
DATED : February 9, 2021
INVENTOR(S) : Roman Shmulevich et al.

Page 1 of 1

It is certified that error appears in the above-identified patent and that said Letters Patent is hereby corrected as shown below:

In the Claims

In Column 16, Line 61, in Claim 12, delete "various" and insert -- varies --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*